US005933918A

United States Patent [19]

Wallays

[11] Patent Number: 5,933,918

[45] Date of Patent: Aug. 10, 1999

[54] HANDLE WITH INTERCHANGEABLE KITCHEN IMPLEMENTS

[75] Inventor: Nele Wallays, Antwerp, Belgium

[73] Assignee: Dart Industries Inc., Orlando, Fla.

[21] Appl. No.: 08/925,550

[22] Filed: Sep. 8, 1997

[51] Int. Cl.[6] .................... A47J 45/00

[52] U.S. Cl. .................... 16/114 R; 30/340; 16/111 R

[58] Field of Search .................... 16/114 R, 111 R, 16/114 A, 340, 162, 151, 319, 142

[56] References Cited

U.S. PATENT DOCUMENTS

| | | | |
|---|---|---|---|
| D. 172,235 | 5/1954 | Marino . | |
| D. 221,291 | 7/1971 | Futter . | |
| 1,577,880 | 3/1926 | Stuart | 30/340 X |
| 4,247,216 | 1/1981 | Pansani . | |
| 4,425,709 | 1/1984 | Quenzi | 30/151 |
| 4,432,137 | 2/1984 | Okada | 30/319 X |
| 4,974,286 | 12/1990 | Stowell et al. . | |
| 5,170,539 | 12/1992 | Lundstedt et al. . | |
| 5,222,279 | 6/1993 | Frano et al. | 24/625 |
| 5,479,708 | 1/1996 | Thomas . | |
| 5,507,076 | 4/1996 | Anscher | 24/625 |
| 5,598,634 | 2/1997 | Berns . | |
| 5,664,792 | 9/1997 | Tseng | 16/114 R X |
| 5,752,968 | 5/1998 | Jolly et al. | 30/162 X |

FOREIGN PATENT DOCUMENTS

| | | |
|---|---|---|
| 2026309 | 2/1980 | United Kingdom . |
| 2 262 962 | 7/1993 | United Kingdom . |

OTHER PUBLICATIONS

"La Forme Accessories" Advertisement with Translation.

*Primary Examiner*—Brian K. Green

*Attorney, Agent, or Firm*—John A. Doninger; Taylor J. Ross

[57] ABSTRACT

The handle of the kitchen utensil is rearwardly tapering with a generally oval transverse cross-section progressively smaller toward the rear of the handle. The forward end of the handle incorporates a forwardly opening chamber which receives the mounting portion of an implement in seating relation therein, the implement having opposed spring-loaded protuberances engaged through apertures in the chamber wall and retracted only by external manual pressure thereagainst.

19 Claims, 4 Drawing Sheets

HANDLE WITH INTERCHANGEABLE KITCHEN IMPLEMENTS

BACKGROUND OF THE INVENTION

The invention relates to kitchen utensils which, conventionally, include a handle and a forward working portion or implement, for example a cutting wheel, brush, scraper or the like, rigidly affixed to one end of the handle.

Such utensils, particularly because of the individual handles associated therewith, are normally rather bulky objects which require substantial storage space and can be difficult to properly clean. It has been proposed that such utensils utilize a universal handle, that is a handle capable of accommodating multiple different implements or working portions, note for example the following patents:

4,974,286:Stowell et al 5,479,708:Thomas

GB 2,026,309:Digirolamo

While the utensils disclosed in these patents provide for the convenience of a single handle with interchangeable implements, each is for a rather special purpose and would appear from the disclosures to lack a significant degree of rigidity in the mounting of the implements. For example, in each instance, the implement can be removed by merely a direct pulling of the implement from the handle.

SUMMARY OF THE INVENTION

The object of the present invention is, essentially, to provide a kitchen utensil, including a multi-use handle, which significantly and uniquely improves on known devices. The improvements are directed to substantially all aspects of the utensil construction, including the configuration of the multi-use handle to achieve maximum ergonomic benefits, the provision of a positive although releasable interlock between the implement and the handle whereby accidental disengagement is not possible, the provision of a rigid retention of the mounted implement by the handle, and the provision of implements which are, in themselves and in combination with handle, distinctive.

The handle itself is elongate and rearwardly tapers from an open forward end to a narrow rear end, and includes outwardly convex top and bottom surfaces. So configured, the handle is uniquely adapted for accommodation within a clenched hand which naturally forms a tapered socket wider at the index finger and smaller at the little finger.

The handle, in order to accommodate spring legs on the mounting portion of the implements, has a forwardly opening chamber with laterally opposed apertures opening into exterior recesses formed in the opposed side edges of the handle for a protective accommodation of locking protuberances or enlargements on the free ends of the legs whereby withdrawal of the implement from the handle is positively precluded until such time as both locking protuberances are manually depressed and released in combination with a positive forward movement of the implement relative to the handle.

The stability of the mounted implement is assured by the slidable and snug engagement of a rearwardly extending extension which is directly received within the chamber forward of the locked protuberances. The protuberances engaged in the apertures are of a size, and retained under a constant biasing force eliminating any play or free movement of the protuberances within the apertures. In addition, the leading end of the handle includes concave forwardly directed edges on the upper and lower walls of the formed chamber against which is engaged a convex rear surface or shoulder on the integral body of the individual implements. Finally, the rear end of the implement, on the mounting portion thereof, seats within a recess defined in the inner wall of the chamber. Thus formed, no relative movement between the handle and a mounted implement is possible.

The implements themselves, basically include a central body with a rearwardly extending mounting portion formed of an elongate stem with a transverse head on the free rear end thereof. This head in turn mounts a pair of locking legs having outwardly directed locking protuberances thereon. The body, in most instances, includes a rearwardly directed convex face which intimately seats within the concave forward end of the handle with the actual working head or tool integral with and extending from the forward end of the body.

In one specialized form of implement, the brush implement, the body is of a constant cross-section with the rear portion thereof comprising an extension received within the leading end of the chamber and the forward end positioned substantially forward thereof and mounting the brush bristles. A protective sleeve mounts on the body and is selectively positioned thereon, by positioning detents, between a forward position protectively enclosing the bristles, and a rear position completely exposing the bristles and engaging the concave forward end of the handle.

Other features, object and advantages of the invention will become apparent from the more detailed description of the invention following hereinafter.

DESCRIPTION OF PREFERRED EMBODIMENTS

Figures 1, 2, 3:
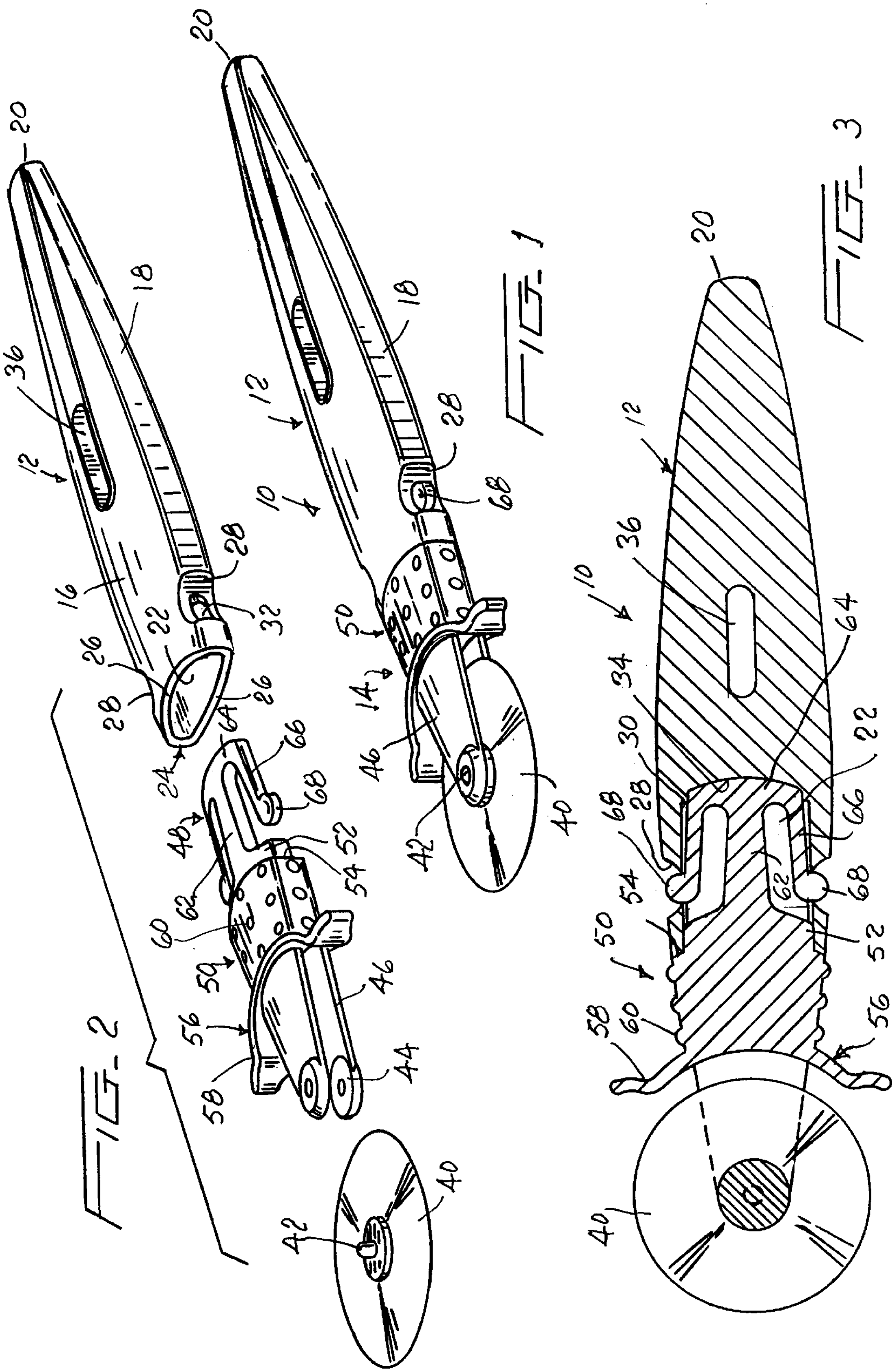
FIG. 1 is a perspective view of the multi-use handle of the invention mounting a wheel cutter implement, for example a pizza cutter.
FIG. 2 is an exploded perspective view of the utensil of FIG. 1.
FIG. 3 is an enlarged longitudinal cross-sectional view through the utensil of FIG. 1.

Referring now more specifically to the drawings, and in particular FIGS. 1, 2 and 3, it will be seen that the kitchen utensil 10 basically comprises two components, a multi-use handle 12 and a removable implement 14 releasably locked to the handle.

The handle 12 has outwardly convex duplicate upper and lower surfaces 16 and opposed side edges 18 which converge rearwardly along substantially the full length of the handle 12 and terminate in a reduced rear handle end 20. Thus formed, the handle in its entirety has a rearwardly tapering configuration with arcuate upper and lower surfaces 16 for convenient and comfortable reception within the hand of the user.

An internal chamber 22 is formed within the forward portion of the handle 12 and opens forwardly through the front end 24 of the handle 12. This front end 24, and particularly the forward edges 26 of the upper and lower walls of and defined by the chamber 22, define a forwardly directed concave seat adapted to receive a correspondingly configured portion of the implement 14 for a stabilization thereof in a manner to be described subsequently.

The opposed side edges 18 of the handle have laterally aligned recesses 28, one defined in each of the edges at a location therein rearward of the chamber wall edges 26 and forward of the inner wall 30 of the chamber 22. Each recess 28, in turn, has an aperture 32 through the lowermost portion thereof and in communication with the interior of the chamber 22.

Noting the cross-sectional view of FIG. 3, it will be seen that the inner or back wall of the chamber 22 includes a central recessed portion 34 which is intended to contribute to the stabilization of a mounted implement 14. It will also be noted that while the general configuration of the handle 12 tapers rearwardly, the maximum width of the handle is approximately at the inner wall of the chamber with the opposed side edges 18 tapering very slightly forward thereof to the front end 24 of the handle.

For convenient storage purposes, the handle is also provided with an elongate hanging slot 36 extending therethrough between the opposed convex upper and lower surfaces 16. This slot 36 is generally centered on the center of gravity of the handle whereby the opposed end sections of the slot 36 will allow for a stable hanging of the handle 12 with the forward chamber-defining end positioned either upward or downward.

The implement 14, illustrated in FIGS. 1, 2 and 3, is a food cutting wheel, for example a pizza cutter, and includes a cutting disk 40 with opposed stub shafts 42 rotatably engaged within opposed journals 44 defined in the forward ends of a pair of arms 46. The arms 46, while substantially rigid, have a slight degree of flexible resiliency to allow for a springing apart of these arms 46 to mount the disk 40 therebetween. This forward portion of the implement, including the arms 46 and the cutting disk 40, can be considered the working portion of the implement 14 which is in turn unitarily formed or molded with the rearwardly directed mounting portion 48 by means of an intermediate or central body 50. The body 50 includes a dimensionally reduced rearwardly extending extension 52 which, as noted particularly in FIG. 3, is sized as to be slidably although closely received through the chamber mouth and into the forward portion of the chamber forward of the recess apertures 32. The body 50 includes a rearwardly directed shoulder 54 peripherally thereabout and defined by the reduced dimension extension 52. This shoulder 54 is rearwardly convex, complimenting the concave leading or forward end of the handle and intimately nests therewith upon a full seating of the implement.

The forward end of the body 50 includes a transverse finger rest or guard 56 extending beyond opposed sides of the main body portion generally in the plane of the cutting disk 40 and so as to overlie the disk and both provide against accidental engagement of the fingers with the disk and to provide a means for applying downward pressure to the utensil as the cutting disk is manipulated. As will be noted particularly in FIG. 3, the finger rest 56 includes slight depressions 58 therein rearwardly directed to provide stabilizing or nesting points for the fingers engaged therewith.

The body 50, and in particular the main portion thereof forward of the shoulder 54, is intended to provide a convenient means for a grasping of the implement 14 during the mounting and removal thereof, as well as during a manipulation of the assembled utensil. Accordingly, the exterior surface of this main body portion is provided with a plurality of low profile gripping bumps or knobs 60 thereon. It will also be seen that this main portion of the body 50 tapers slightly forwardly from the shoulder 54 to the finger guard 56 with this taper conforming to and defining a continuation of the slight forward taper of the handle forward of the handle recesses 28, allowing for a smooth continuous surface from the handle to the finger guard.

The mounting portion 48 of the implement 14 includes a rearwardly extending central stem 62 integral with the body extension 52 and terminating in a transverse head 64 which is dimensionally configured for close slidable reception within the back wall recess 34 as a stabilizing means. Integral with the opposed ends of the transverse head 64 are a pair of forwardly extending locking legs 66, each terminating in a laterally outwardly directed generally cylindrical protuberance 68.

While the legs 66 are of a transverse width as to allow for a substantially free sliding into the chamber 22 between the opposed side walls thereof, the protuberances 68, prior to insertion of the mounting portion, extend laterally beyond the chamber sides wherein a compression of the legs 66 toward each other is required for insertion of the protuberances 68 within the chamber 22. Pursuant thereto, the legs 66, in themselves or in conjunction with the transverse head 64, are slightly flexibly resilient, for an inward flexing of the opposed legs 66 toward the stem 62 sufficient to permit introduction of the protuberances 68 into the chamber. These protuberances align with and are outwardly projected into the side wall apertures 32 simultaneously with a seating of the head within the central recess 34 of the back wall of the chamber.

Again noting FIG. 3, it will be seen that the generally cylindrical configuration of the protuberances 68 provide, in conjunction with the complimentary sized apertures 32, a wedging of the protuberances within the apertures for a positive stable interlock wherein disengagement is precluded in the absence of positive manual pressure simultaneously on the opposed protuberances in conjunction with a forward pulling on the implement 14. It is also of significance to note that the protuberances, upon engagement through the apertures 32, are received in the side recesses 28 of the handle and terminate at or slightly inward of the outer side surfaces of the handle as a protective means against accidental manipulation of the protuberances and to allow for smooth passage of the hand or fingers thereover. As will be appreciated, the engaged protuberances 68 are, when engaged, maintained under slight pressure by the biasing force of the legs 66. It will also be noted that, upon a full seating of the mounting portion 48, the rearwardly directed shoulder 54 of the body 50 seats intimately against the arcuate forward end 24 of the handle 12 about the chamber mouth. Thus, any movement of the mounted implement 14 relative to the handle 12 in any direction is specifically precluded and results in an assembled utensil which is the equivalent of a solid one-piece utensil in rigidity. With regard to the assembly of the implement, it is also to be noted that the leading transverse head 64 with the legs 66 trailing therefrom, substantially simplifies the insertion of the mounting portion within the chamber in that, in effect, a single insert member is provided, thus requiring no manipulation other than for a straight insertion of the mounting portion. It will also be recognized that the generally circular configuration of the protuberances and the slightly beveled leading edges of the handle front end, note FIG. 3, actually provide camming surfaces which, upon engagement, provide for an automatic retraction of the protuberances 68 as the implement is forced inwardly toward the handle. For a positive seating, the shoulder 54 will also preferably be slightly beveled.

Figure 11:
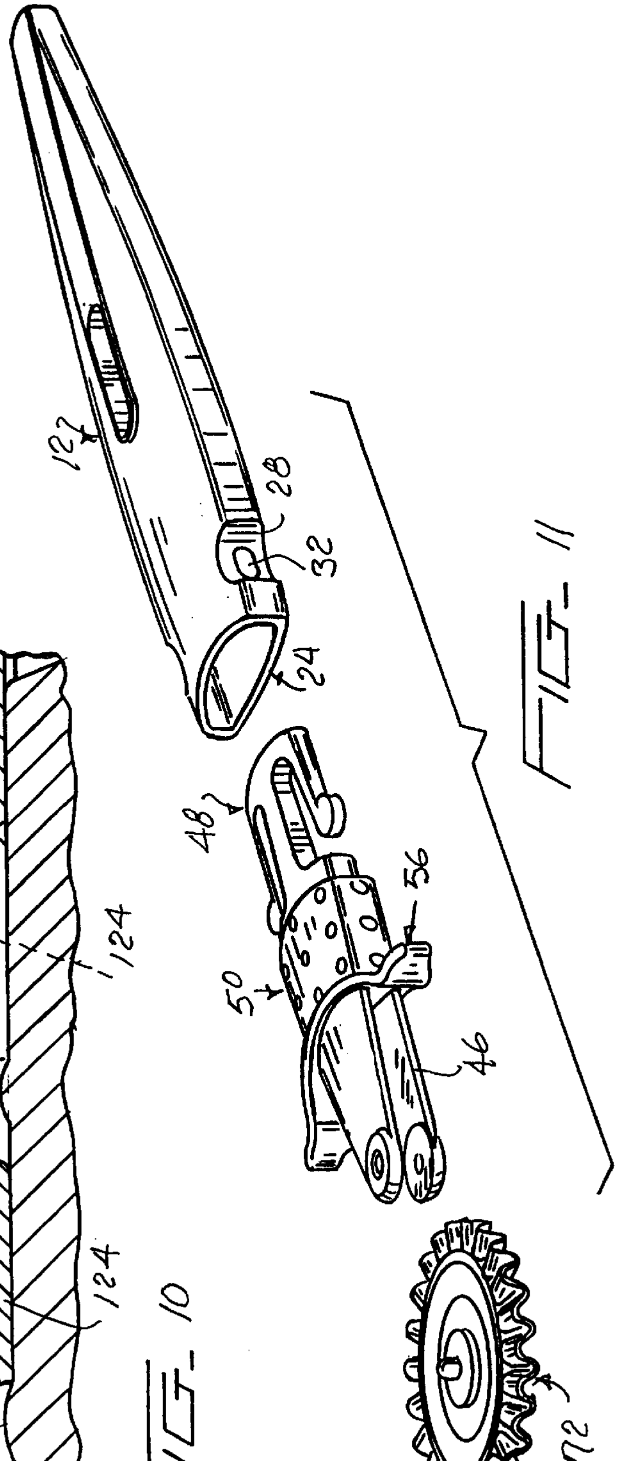
FIG. 11 is an exploded perspective view similar to FIG. 2 and illustrating a modified form of wheel, for example a pastry cutting wheel.

Referring briefly to FIG. 11, it will be noted that the resiliently flexible nature of the forwardly extending mounting arms 46 on the implement 14 allows for a mounting of a variety of different types of cutting wheels or disks 40, including a fluted pastry cutter wheel 72 as illustrated.

Figure 4:
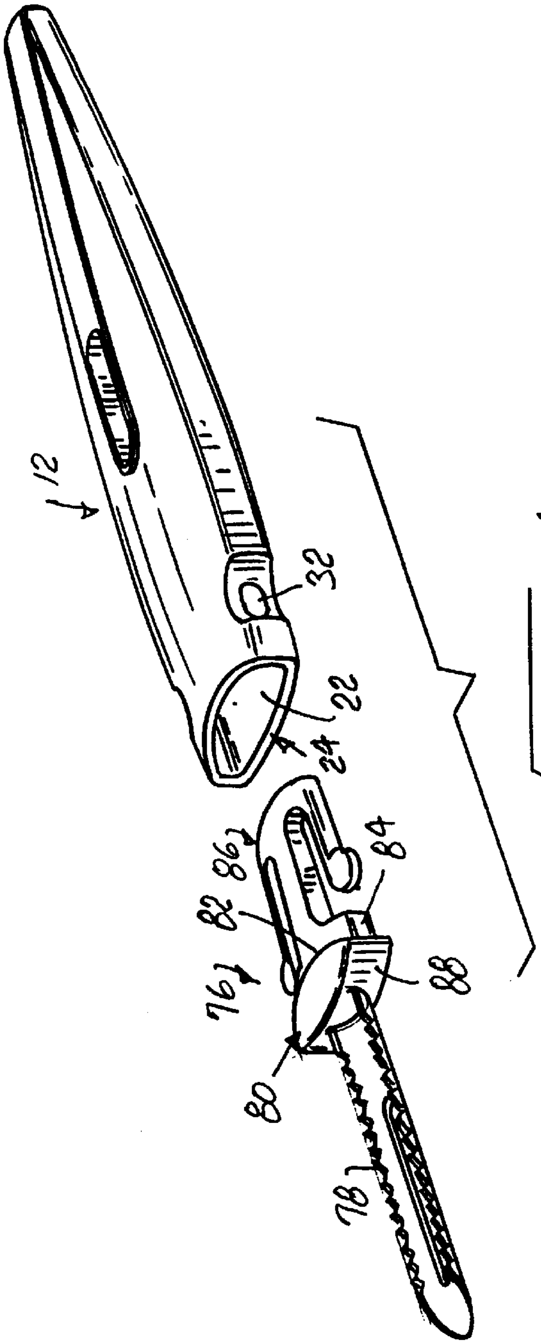
FIG. 4 is an exploded perspective view of a modified implement in the nature of a peeler and scraper.

FIG. 4 illustrates another form of implement 76 wherein the tool or working head comprises an elongate combination scraper and peeler 78 integral with and permanently affixed to the central body 80. The central body, similar to implement 14, includes a rearwardly directed convex surface defining a seating shoulder 82 about a central dimensionally reduced rearwardly extending extension 84 which in turn is unitary with the mounting portion 86. The shoulder 82, extension 84 and mounting portion 86 duplicate the shoulder 54, extension 52 and mounting portion 48 of implement 14 and cooperate with the handle 12 in the same manner. The forward face of the body 88 is also outwardly convex transversely of the implement and defined on a similar radius. The opposed arcing surfaces meet at the corresponding ends thereof and define a generally elliptical configuration, the height and width of which conforms to the height and width of the forward end 24 of the handle 12.

Figure 5:
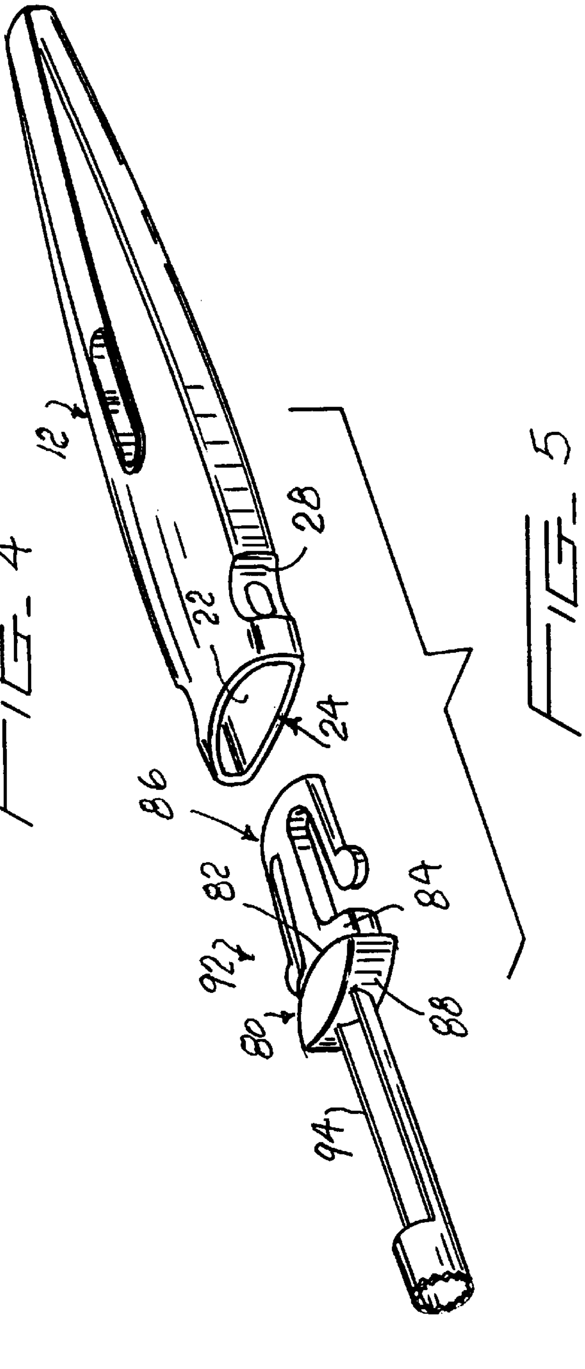
FIG. 5 is an exploded perspective view of a modified implement in the nature of corer.

The implement 92 in FIG. 5 substantially duplicates the implement 76, differing therefrom only in the working portion or tool 94 which comprises a forwardly elongate corer. The remaining portions of the implement 92 have been designated by the same reference numerals described above with regard to implement 76.

FIGS. 6–10 illustrate another form of implement 100 selectively used with the handle 12. The implement 100 is, or includes a working portion or tool which is a brush 102 and includes, as a separate cooperating component, a protective sleeve 104.

The implement 100, and in particular the brush component thereof, includes an elongate body 106 substantially elliptical in cross section and of a constant cross section rearward of a similarly configured although slightly enlarged forward end portion 108 which in turn defines a rearwardly directed shoulder 110 thereabout. The rear portion of the body 106, that area generally designated by reference numeral 112 is slidably and snugly received within the forward portion of the handle. This extension, as in the previously described embodiments, is integral with the stem 114 of the mounting portion 116 which duplicates the mounting portion 48 and cooperatively locks within the handle chamber as previously described. The body, for use in positioning the sleeve 104, includes, along the opposed side edges 118 thereof, a series of transversely extending positioning bosses 120.

The sleeve 104 has a cross-sectional configuration which substantially duplicates that of the forward end 24 of the handle 12. The rear end 122 of the sleeve 104 is of a rearwardly directed convex configuration conforming to the forwardly directed concave configuration of the forward end 24 of the handle whereby the sleeve, in its fully retracted position, as in FIG. 9, has the rear portion thereof intimately seating with the forward end of the handle.

Figure 6:
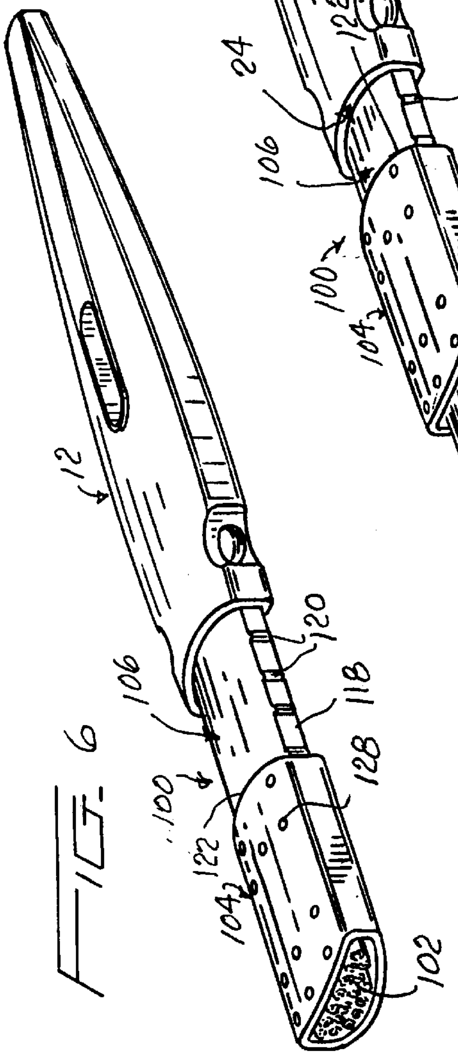
FIG. 6 is a perspective view of the handle and a mounted and protectively enclosed brush implement.
Figure 9:
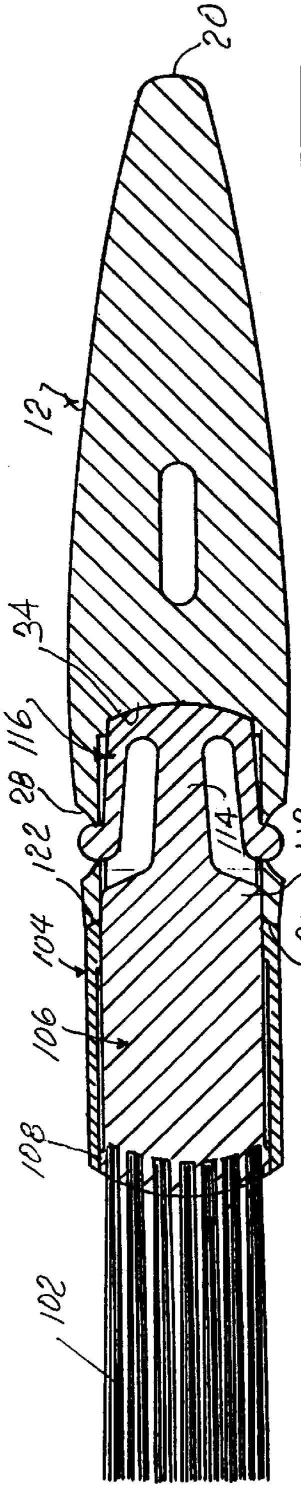
FIG. 9 is a longitudinal cross-sectional view through the brush utensil with the protective sleeve fully retracted.

Noting FIG. 9, the rear portion of the handle 104 includes a peripheral inwardly directed collar portion 124 defining a forwardly directed shoulder 126. This collar 124 is of approximately equal height with the forward portion 108 of the body 106. In the forwardmost position of the sleeve 104, as illustrated in FIG. 6 wherein the brush is protectively enclosed by the sleeve, the forwardly directed collar shoulder 126 seats against the rearwardly directed shoulder 110. The sleeve 104 is releasably retained in this position by the forwardmost bosses 120 which simultaneously engage the rear end 122 of the sleeve 104 which also forms the rear edge of the integral collar 124. As will be appreciated, the sleeve 104, while substantially rigid, includes a sufficient degree of flexible resiliency as to, upon the application of positive manual force thereon, ride over the positioning bosses 120.

Figure 7:
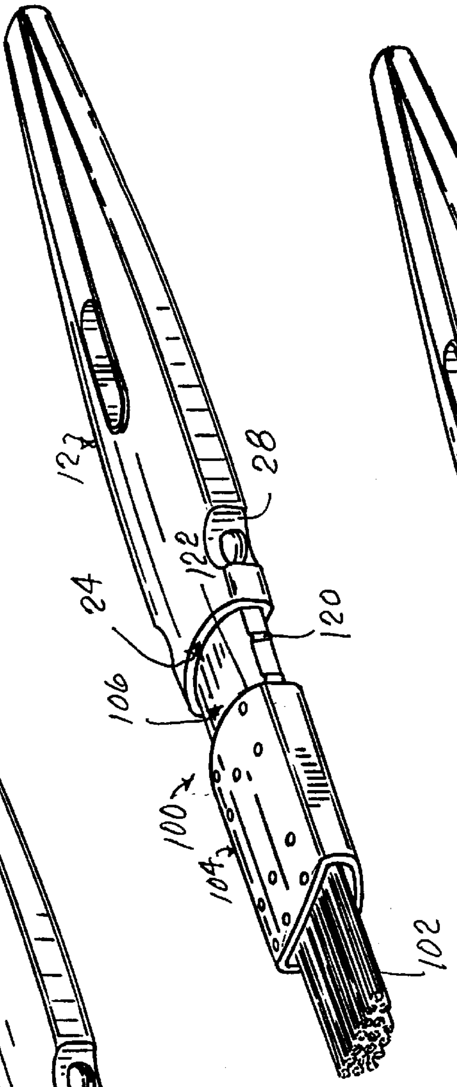
FIG. 7 is a perspective view similar to FIG. 6 with the protective sleeve partially retracted.
Figure 8:
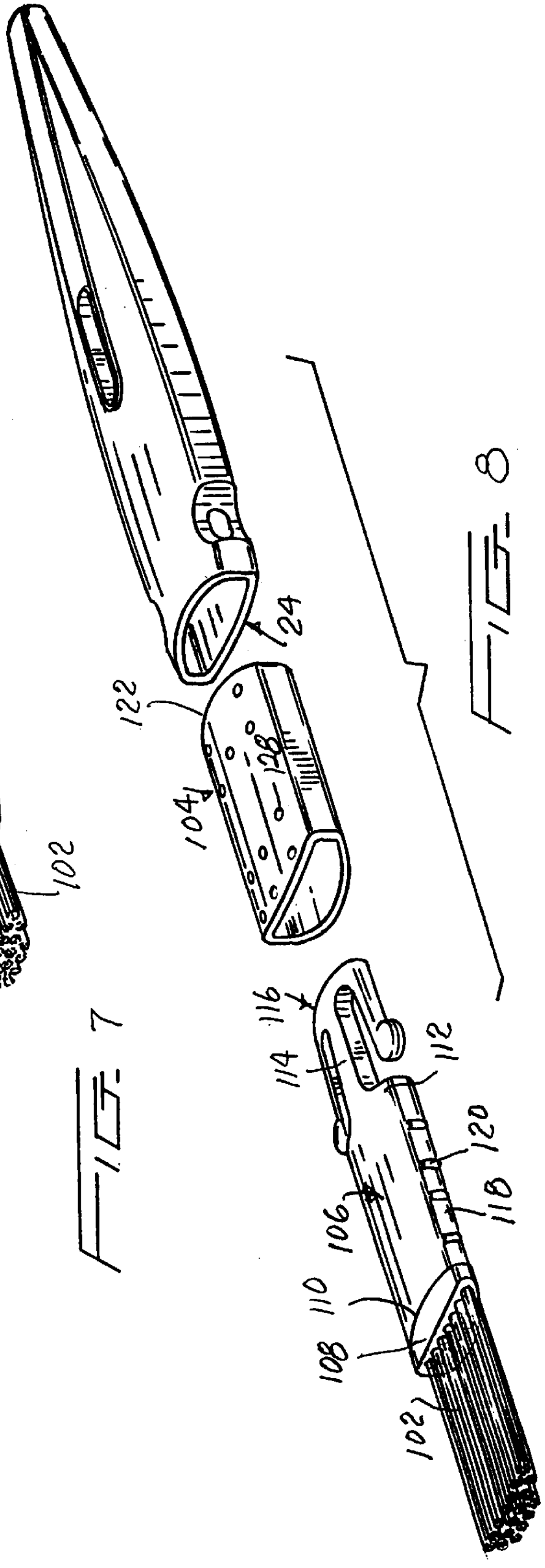
FIG. 8 is an exploded perspective view of the brush utensil.

The provision of multiple bosses along the length of the body 106 allows for intermediate positioning of the sleeve 104, as illustrated in FIG. 7, so as to partially overlie the bristles of the brush 102 and thus vary the flexibility of the projecting portion thereof. Manipulation of the sleeve is facilitated by the provision of small protuberances 128 on the upper and lower outwardly convex surfaces thereof.

Figure 10:
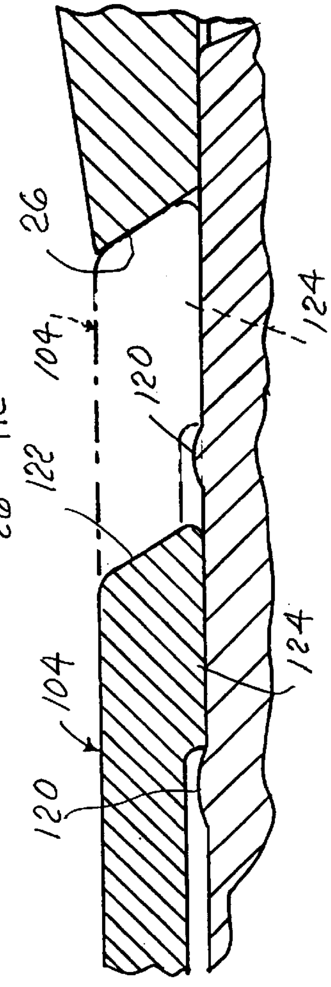
FIG. 10 is an enlarged cross-sectional detail illustrating the positioning detents for releasably retaining the sleeve in adjusted positions.

The detailed illustration of the FIG. 10 is of interest in illustrating the sleeve 104 at an intermediate position on the implement body 106 and releasably retained thereat by engagement against a boss 110 immediately forward thereof. This figure is also of interest in illustrating, in phantom lines, the rear portion of the fully retracted sleeve wherein the rear face 122 of the sleeve nests intimately against the forward end face of the handle. At the same time, the forwardly directed shoulder 126 of the sleeve collar 124 is engaged by the rearmost boss 120 to, in effect, lock the sleeve fully open in a secure and stable position between the rearmost pair of laterally opposed knobs 120 and the forward end 24 of the handle. Thus, the completely retracted sleeve, which provides for full manipulation of the brush, acts in conjunction with the extension portion 112 intimately engaged within the forward portion of the chamber 22, and the free end of the mounting portion 116 seated within the central recess 34 of the inner or back wall 30 of the chamber to provide for a rigid and substantially integral combining of the implement 100 with the handle 12, precluding any movement therebetween other than for a positive manipulation of the sleeve or a positive manual retraction of the mounting portion protuberances so as to release these protuberances from the associated handle apertures 32. As previously noted, the apertures 32 are spaced forward of the back wall of the chamber a distance which insures an engagement of the protuberances therethrough simultaneously with a full seating of the head of the mounting portion in the rear wall aperture 34. Such a multi-surface engagement is present between each mounted implement and the handle and insures a stability fully equal to that of a unitary handle and implement utensil.

The foregoing is illustrative of various features of the invention. As obvious variations may occur to those skilled in the art, particularly with regard to the types of implements to mount to the handle, it is intended that the scope of the invention be defined by the claims following hereinafter.

I claim:

1. A handle with an interchangeable kitchen implement, comprising:

an elongate handle adapted to selectively mount one of a plurality of implements, said handle having opposed forward and rear ends, upper and lower surfaces, and opposed elongate side edges, a hollow chamber defined within said handle and having an open end opening through said forward end of said handle, a pair of recesses, one in each of said opposed side edges, in closely spaced relation to said forward end of said handle, and an aperture defined in each recess and opening into said chamber to form a locking component for a chamber-received implement; and an implement having a central body, a working portion fixed to and extending forwardly from said body, a rear mounting portion receivable in said handle chamber, and a rearwardly directed extension on said body rigidly joining said mounting portion to said body, said mounting portion including an elongate stem extending rearwardly from said body extension and terminating in a transverse head, said head having opposed ends integral with a pair of forwardly extending laterally spaced locking legs extending parallel to and spaced from said stem, each leg having a forward end with an integral locking protuberance extending laterally outward of the corresponding leg for reception within an aligned one of said recesses upon reception of said mounting portion in said chamber.

2. The handle with implements of claim 1 wherein said recesses are laterally aligned.

3. The handle with implements of claim 2 wherein said forward end is concave and defines a seat for a received implement.

4. The handle with implements of claim 3 wherein said handle tapers rearwardly at least from said chamber to said rear end.

5. The handle with implements of claim 4 wherein said upper and lower surfaces are convex.

6. The handle with implements of claim 1 wherein said upper and lower surfaces are convex, said handle tapering rearwardly with said upper and lower surfaces converging rearwardly and said side edges converging rearwardly.

7. The handle with implements of claim 2 wherein said forward end is arcuate and defines a seat for a received implement.

8. The handle with implements of claim 1 wherein said chamber is of a predetermined width between said sides, said locking protuberances defining a width therebetween greater than the width of the chamber, said legs being resiliently compressible toward each other and, when compressed, fully slidable into said chamber, said protuberances forcibly extending into said apertures upon alignment therewith.

9. The handle with implements of claim 8 wherein said protuberances, when received in said handle apertures, extending into said side edge recesses.

10. The handle with implements of claim 9 wherein said body extension is of a width slightly less than the width of the chamber for close sliding reception therein between the open end of said chamber and said apertures.

11. The handle with implements of claim 10 wherein said body has a rearwardly directed shoulder forward of said extension and peripherally about said body, said shoulder being co-extensive with said forward end of said handle about said chamber and received in seating engagement against said forward end upon engagement of said locking protuberances in said apertures.

12. The handle with implements of claim 11 wherein said shoulder is arcuate and conforms to the arcuate forward end of said handle.

13. The handle with implements of claim 12 wherein said forward working portion comprises forwardly extending integral arms and a cutting disk rotatably mounted to and between said arms.

14. The handle with implements of claim 13 wherein said body includes a forward end with a pair of laterally extending extensions defining finger rests, said extensions overlying said cutting disk to opposed sides of said arms.

15. The handle with implements of claim 14 including multiple gripping protrusions on said body between said body extension and said finger rests.

16. The handle with implements of claim 10 wherein said body is elongate, and a protective sleeve slidably mounted on said body for movement therealong between an extended forward position completely enclosing said working portion and a retracted position completely exposing said working portion.

17. The handle with implements of claim 16 including cooperating locking means on said sleeve and said body for releasably retaining said sleeve in multiple adjusted positions between said extended and retracted positions thereof.

18. The handle with implements of claim 17 wherein said sleeve has an arcuate rear end conforming to and intimately received against the arcuate forward end of said handle in the fully retracted position of said sleeve.

19. The handle with implements of claim 18 wherein said locking means includes means for locking said sleeve in its fully retracted position engaged with said forward end of said handle.

* * * * *